July 27, 1954   J. S. HASBROUCK   2,684,739
CLUTCH FOR A TWO-SPEED PROPELLER DRIVE

Original Filed Sept. 21, 1946   5 Sheets-Sheet 2

INVENTOR
*John S. Hasbrouck*
BY *Joseph K. Schofield*
ATTORNEY

July 27, 1954  J. S. HASBROUCK  2,684,739
CLUTCH FOR A TWO-SPEED PROPELLER DRIVE
Original Filed Sept. 21, 1946  5 Sheets-Sheet 3

INVENTOR
John S. Hasbrouck
BY
ATTORNEY

July 27, 1954  J. S. HASBROUCK  2,684,739
CLUTCH FOR A TWO-SPEED PROPELLER DRIVE
Original Filed Sept. 21, 1946  5 Sheets-Sheet 4

INVENTOR
John S. Hasbrouck
BY Joseph K. Schofield
ATTORNEY

Patented July 27, 1954

2,684,739

UNITED STATES PATENT OFFICE 2,684,739

CLUTCH FOR A TWO-SPEED PROPELLER DRIVE

John S. Hasbrouck, Glastonbury, Conn., assignor to United Aircraft Corporation, East Hartford, Conn., a corporation of Delaware Continuation of application Serial No. 698,461, September 21, 1946. This application June 15, 1950, Serial No. 168,327

10 Claims. (Cl. 192—48)

This invention relates to aircraft propeller drives and particularly to a two-speed transmission between an engine crankshaft and its propeller shaft, and means for changing the speed ratio of transmission. This application is a continuation of my copending application Serial No. 698,461, filed September 21, 1946, now abandoned.

A primary object of the invention is to provide a novel and improved means for effecting changes in the speed ratio between an aircraft engine crankshaft and the propeller shaft driven thereby.

Another object of importance is to provide an improved two-speed reduction gear including a type of clutch which allows shifting from one speed to the other without completely disengaging the engine from the propeller, or pausing in a neutral or central position while synchronizing the speeds of the members, whereby changes in the speed ratio of transmission between an engine crankshaft and a propeller driven thereby may be effected rapidly, positively, and dependably, with minimum loss of power.

Various other objects and advantages will be apparent as the nature of the invention is more fully disclosed in an illustrative embodiment which is now considered to be a preferred form of the invention.

In certain types of modern airplanes having high maximum speeds and relatively heavy wing loadings, it has been found desirable to provide means for changing the speed ratio between the engine and its propeller. For example, in some installations it may be found desirable to operate the propeller at a very high rotational speed and with the blades adjusted for a relatively low pitch angle during take-off in order to develop the necessary tractive thrust with the engine operating at a maximum power and while the airplane is traveling at relatively slow speeds. As the speed of the airplane increases, it is desirable to operate the propeller at a slower speed relative to engine speed, with the blades adjusted for a higher pitch angle. In other installations, it may be desirable to operate the propeller at a lower speed relating to engine speed during take-off than in cruising, while in still other cases various other reasons exist for utilizing alternatively usable change speed gear propeller drives of the type referred to.

An efficient two-speed reduction drive for situations of the above type is disclosed in my copending application Serial No. 568,108, filed December 14, 1944, now Patent No. 2,444,227, issued June 29, 1948 in which a slidable clutch member is actuated hydraulically to selectively engage either one of a pair of alternatively usable gears having different tooth members to drivingly connect the selected gear to drive the propeller from the engine crankshaft, synchromesh means being provided to prevent engagement of said clutch member except when the rotative speeds of their intermeshing parts are approximately equal.

The present invention is a modification of the change speed transmission disclosed in my application referred to above and employs a two-speed jackshaft type propeller drive including high and low speed gears, a non-free wheeling mechanism associated with the high speed gear, and a jaw type shifting member for drivingly connecting the engine crankshaft to the propeller shaft through either the high or low speed gear. In changing from low to high speed gear connection, it is desirable to prevent the propeller from being free to rotate independently of the engine. It is, therefore, a principal object of the invention to provide a clutch acting when shifting from low to high gear to momentarily drive the engine and its driving connections from the propeller until the driving connection is complete.

The novel features characteristic of this invention are set forth more in detail in the claims appended hereto, but the nature and scope of the invention will be better understood by referring to the following description, taken in connection with the accompanying drawings forming a part thereof, in which a specific and preferred embodiment has been set forth in detail for purposes of illustration.

In the following description certain specific terms are used for convenience in referring to the various constructional details of the illustrated form of the invention. These terms, however, are to be interpreted broadly and limited only as the state of the art requires.

Figure 1:
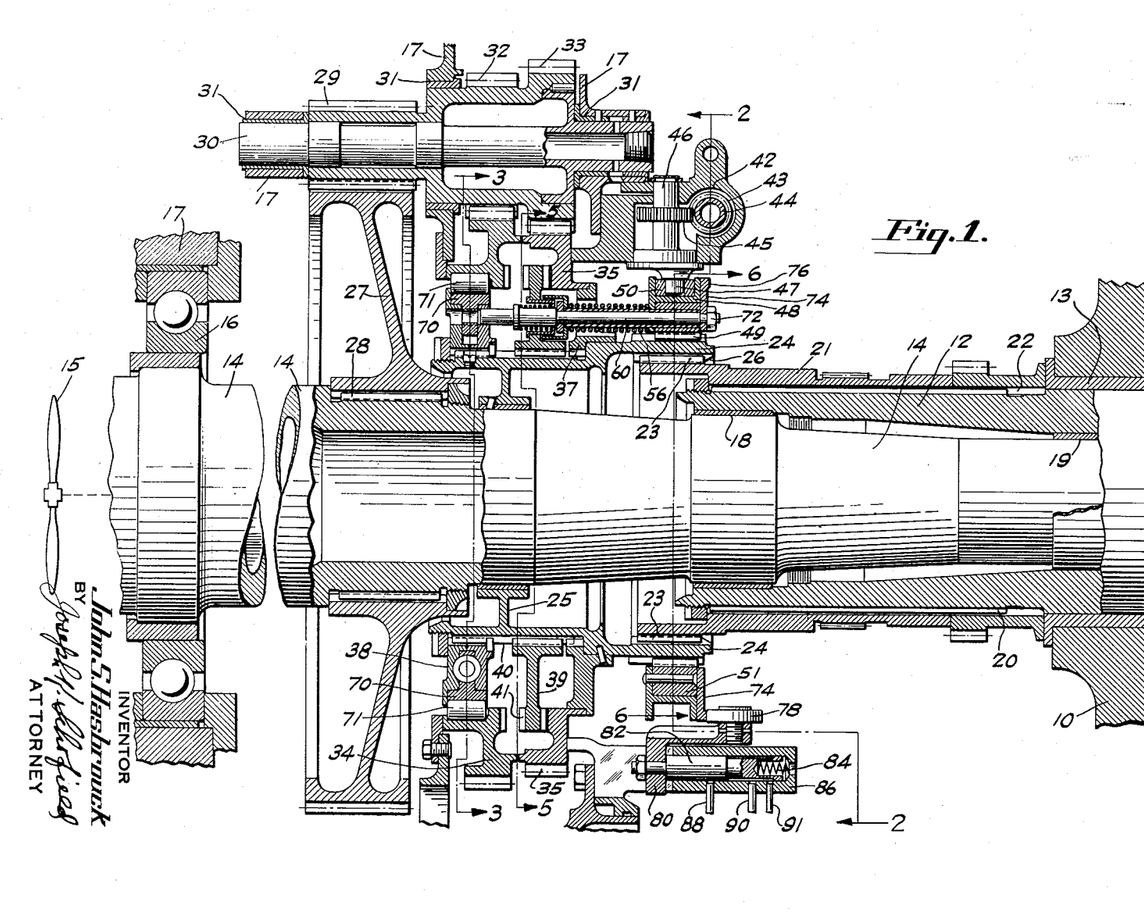
Fig. 1 is a longitudinal sectional view of a speed changing mechanism embodying the present invention, the section being taken substantially on the planes of broken line 1—1 of Fig. 2.

In the drawings, Fig. 1 shows a small part only of an engine crankcase 10 and the forward end only of the engine crankshaft 12 which is rotatably mounted in a front bearing 13 formed in the crankcase 10. Co-axial with the crankshaft 12 and extending within a portion thereof is the propeller shaft 14 having a propeller 15 (shown diagrammatically only) secured to its forward end. The propeller shaft 14 is supported within one or more anti-friction bearings 16 suitably mounted within a frame or housing 17 which may be bolted to the forward face of the crankcase 10 and may enclose the speed change mechanism presently to be fully described. The propeller shaft 14 is also supported by having its engine or trailing end extended to enter the forward end of the crankshaft 12, suitable bearings 18 and 19 being provided therein to permit relative rotation of the two shafts 12 and 14. Mounted on splines 20 formed on the forward end of the crankshaft 12 is a driving member in the form of a thin sleeve 21 having internal longitudinally extending splines 22 adjacent its rear end engaging the splines 20 on the crankshaft.

The sleeve 21 has external splines 23 adjacent its forward end, and these external splines 23 engage corresponding internal splines 26 on the rear end of a ring gear member 24. This ring gear member 24 is supported by a collar 25 formed thereon rotatably engaging the propeller shaft 14 forward of the crankshaft 12. Accordingly, it will be seen that the ring gear member 24 is supported coaxially of the crankshaft 12 and propeller shaft 14 by the sleeve 21 engaging internal splines on the member 24, and by the collar 25 rotatably supported by an intermediate cylindrical portion of the propeller shaft 14.

On the propeller shaft 14 at an intermediate portion thereof is a large driven gear 27 splined at 28 thereon and having its teeth meshing with the teeth of a plurality of pinions 29 on the forward portion of short intermediate shafts 30 arranged in a circular series concentric about the propeller shaft 14 and rotatably mounted upon parallel axes within suitable bearings 31 provided therefor in the frame or housing 17.

As shown in Fig. 1, each of the pinion shafts 30 is provided with three spaced bearings 31 in alignment formed in the frame 17, the driving pinions 29 meshing with the gear 27 on the propeller shaft 14 being disposed between the forward and intermediate bearings. Pinions 32 and 33, which are of different diameters and having different tooth numbers for driving the shafts 30 at either of two speeds, are disposed between the intermediate and rear bearings 31.

Pinions 32 and 33 are positioned adjacent each other on shaft 30 and are continuously in mesh with the intermediate ring gears 34 and 35, respectively. As shown in Fig. 1, gear 35 is rotatably supported concentrically of the crankshaft 12 on an annular flange integral with an annular member 37 keyed or splined to the ring member 24. Gear 34 is rotatably mounted in a like manner on a ring 36 suitably splined to the front end of ring member 24. For purposes presently to be described, the member 36 is made in two companion members suitably secured together.

To operatively connect one of the gears 34 or 35 drivingly to the crankshaft 12, an axially slidable annular member 39 is provided having splines on its inner annulus and radial clutch teeth on opposite sides adjacent its outer periphery. The splines formed on the inner annulus of shifting member 39 are at all times loosely engaged with the elongated splines 40 on the ring member 24 so that member 39 may slide easily thereon. The radial clutch teeth 41 adjacent the outer periphery of shifting member 39 on opposite sides mesh selectively with corresponding clutch teeth on a side surface at the inner periphery of one or the other of the intermediate ring gears 34 or 35, depending upon the operative position to which the shifting member 39 has been moved. With the shifting member 39 in one of its operative positions, a speed reduction is effective between the crankshaft 12 and propeller shaft 14 through gears 34 and 32, and when the shifting member 39 has been moved axially to its other operative position, another reduction ratio is obtained through gears 35 and 33.

Figure 2:
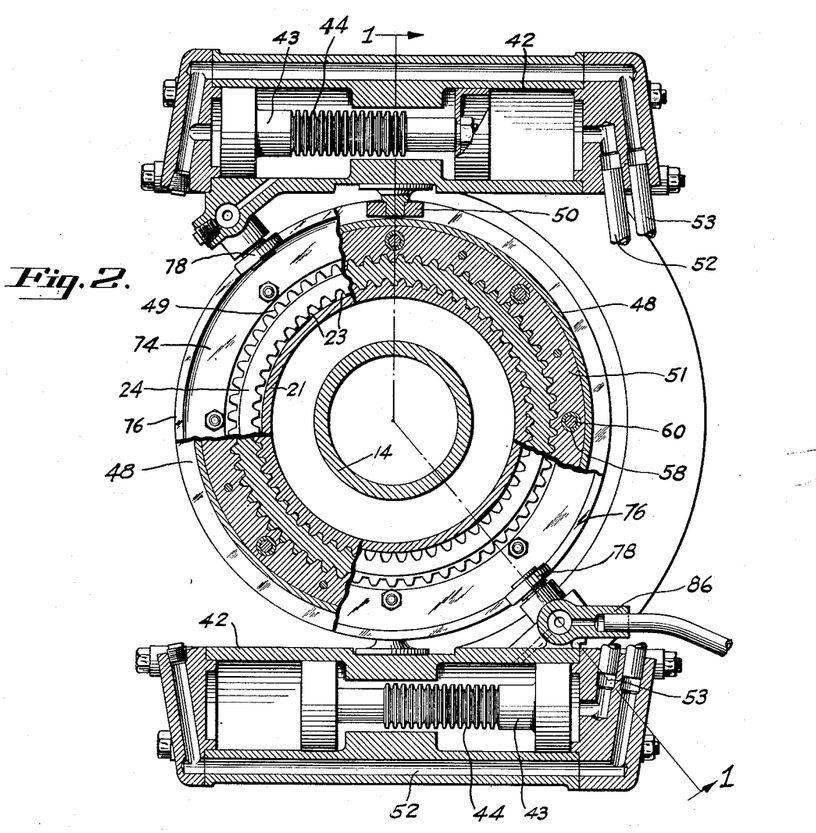
Fig. 2 is a transverse sectional view taken on the plane of line 2—2 of Fig. 1 and on an enlarged scale.

Movement of the shifting member 39 in either direction is effected hydraulically in the illustrated embodiment of the invention, for example by admission of fluid under pressure to one end or the other of one or more cylinders 42 shown in Fig. 2 within which pistons 43 are reciprocable. Each piston 43 is provided at its intermediate portion with a plurality of rack teeth 44, each rack meshing with a small spur gear 45. Each of the small spur gears 45 is mounted adjacent its piston on a short rotatable shaft 46 supported within a portion of the housing 17. On each of these shafts 46, at the inner end thereof, is provided an eccentric or crankpin 47, which eccentrics engage at their free ends within a peripheral groove formed in an annular operating member or ring 48. The operating member 48 has teeth or splines 49 formed in a ring member 51 secured concentrically to the member 48 engaging corresponding splines on the ring member 24, permitting said operating ring 48 to slide longitudinally on ring member 24 and also causing said operating ring 48 to be rotated with the ring member 24, sleeve 21 and crankshaft 12.

Figures 7, 8:
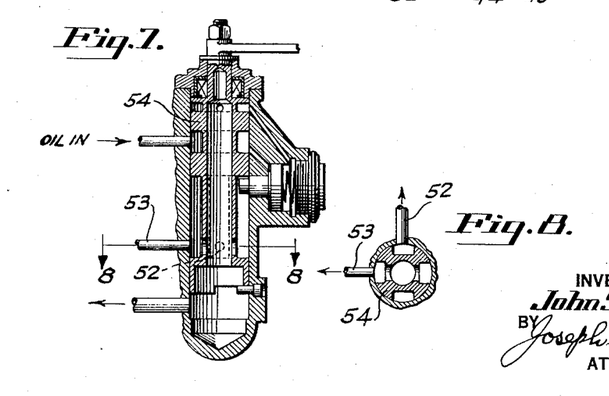
Fig. 7 is a longitudinal sectional view taken centrally through the manually operated shifting valve for hydraulically effecting the speed changes in the driving connections for the propeller.
Fig. 8 is a cross-section taken on the plane of line 8—8 of Fig. 7.

Each of the crankpins 47 is surrounded by a bearing member or shoe 50 directly engaging the side walls of the groove in the operating ring 48. In one position of the pistons 43, the operating ring 48 is in one extreme position, and in the opposite position of the pistons 43 the crankpins 47 have been rotated slightly more than 180° and have moved the operating ring 48 to its opposite extreme position. Fluid under pressure is simultaneously admitted to corresponding ends of the cylinders 42, within which the pistons 43 operate, through appropriate conduits 52 and 53 (Fig. 2) from a manually controlled valve 54 (Figs. 7 and 8) as hereinafter more fully described.

Operation of shifting the member 39 to change the speed ratio will be described in connection with Figs. 9, 10 and 11.

Figure 9:
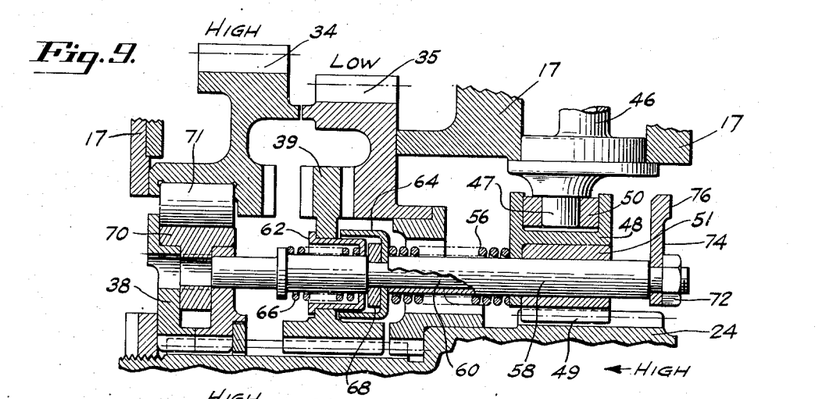
Figs. 9, 10 and 11 are generally similar sectional views showing parts of the gear shifting mechanism in successively different operative positions.
Figure 10:
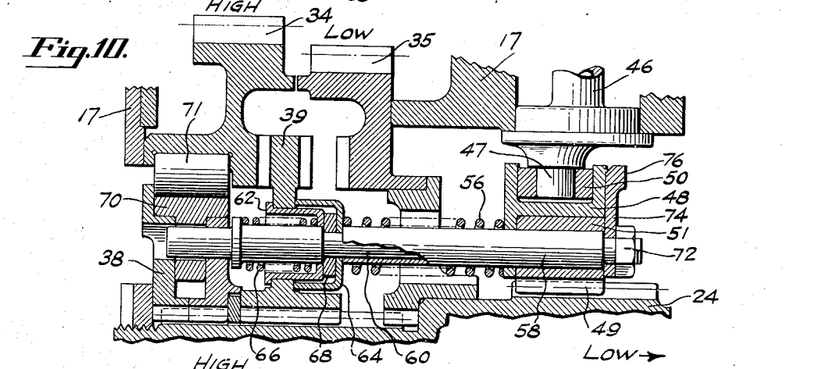
Figure 11:
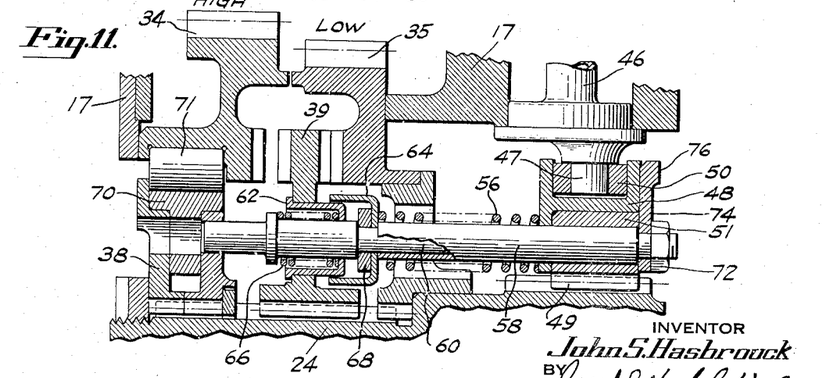

Movement of the operating ring 48 from the position shown in Fig. 11 to that shown in Fig. 9 first compresses a plurality of helical springs 56 individually surrounding sleeves 58 extending through the operating member 48 and the member 51. The sleeves 58 surround rods 60 having mounted thereon two cup members 62 and 64, the outer portions of which bear against opposite faces of the shifting member 39. As shown in Figs. 9, 10 and 11, the inner portion of one series of cup members 64 bears against the ends of helical springs 56 surrounding the sleeves 58 and the opposite series of cup members 62 bears against shorter helical springs 66, the opposite ends of which engage against flanges on enlarged portions of the rods 60. Between each pair of cup members 62 and 64 is a spacing washer 68 on the rods 60 supporting the cup members 62 and 64. The rods are extended toward the left beyond their flanges and enter suitable openings formed in one of the companion members forming the ring member 38.

The first effect of movement to the left of operating ring 48 and compression of the helical springs 56 to change the speed ratio from low to high is to force the extensions of rods 60 further into their openings in gate ring 38. Entry, however, is prevented by a friction clutch member 70, the openings in which are out of alignment with those in the two companion parts of ring member 38. During this period of synchronization the clutch member 39 is held in resilient engagement with low ratio gear 35 by springs 66. This makes it impossible for the propeller to become disengaged from the engine. It is held in one direction by the low ratio gear and in the other by the roller clutch 70. When motion to the left of the sleeves 58 and rods 60 is completed but before rods 60 have moved to the left or driving position the roller friction clutch member 70 and the ring member 38 with the intermediate gear 34 will be rotated due to the rotation of the propeller. The rotation of the propeller 15 engages and holds the friction clutch member 70 in its driving position by movement of the rollers 71 to the positions shown in Fig. 4. Immediately following the completion of motion to the left of the rods 60 and their sleeves 58, when the openings in members 38 and 70 are in alignment, the helical springs 56 compressed by this movement expand and movement of the outer cup members 64 forces the shifting member 39 to the left. Completion of this movement of shifting member 39 which is a continuous movement positively drives gear 34. This final position is shown in Fig. 10.

Movement to the right of the rods 60 and sleeves 58 from the position shown in Fig. 10 to that shown in Fig. 11 whereupon the jaw teeth intermesh as shown in Fig. 9, when the operating ring 48 is moved to the right, first withdraws the extensions of rods 60 from openings within the clutch member 70, thus freeing the intermediate gear 34. Also the increased compression of the left hand series of the shorter helical springs 66 by this movement of member 48 to the right forces the shift ring 39 to the position shown in Fig. 11 in which the clutch teeth bear against the ends of the clutch teeth on gear 35. Thereafter, the clutch member 39, when its jaw teeth intermesh with the teeth on gear 35, can ratchet until the speeds of the two members are the same, after which it moves to its final or low speed driving position shown in Fig. 9. This final movement is effected by expansion of springs 66. The above described mechanism constitutes a synchro-mesh device preventing final engagement of the driving members until they are rotating at identical speeds.

To retain the sleeves 58 in position on their rods 60, the ends of the rods are threaded and a nut 72 mounted thereon to hold the spacing washer 68, the cup member 64 and the sleeve 58 in fixed position. Between the end of the sleeves 58 and the nuts 72 is secured a control ring 74 having a short laterally extending flange 76. In the right hand position of the operating ring 48 this control ring member 74 has its flange 76 engaging a roll 78 on a piston operating member 80 and serving, in this right hand position, to hold the piston 82 within cylinder 86. Movement of the operating ring 48 to the left and corresponding movement of the rods 60 moves this ring 74 to the left and permits movement of the piston 82 to the left by spring 84 housed within its cylinder 86.

With the piston 82 in the position shown in Fig. 1, fluid under pressure supplied through conduit 88 is cut off by the piston covering the port of this conduit. Conduit 90, however, leading to the engine speed regulating governor (not shown) is open to the drain conduit 91. The governor which may be of the type as used with aircraft propellers and as shown in patent to Erle Martin et al., No. 2,365,204, granted December 19, 1944, is adjusted for a certain speed dependent upon its spring adjustment. As soon as the control ring 74 moves to the left when shifting from low to high gear ratio, piston 82 uncovers the fluid supply port 88 and admits fluid to the governor to increase its speeder spring loading and increase the engine speed for the same throttle setting.

Figures 3, 12:
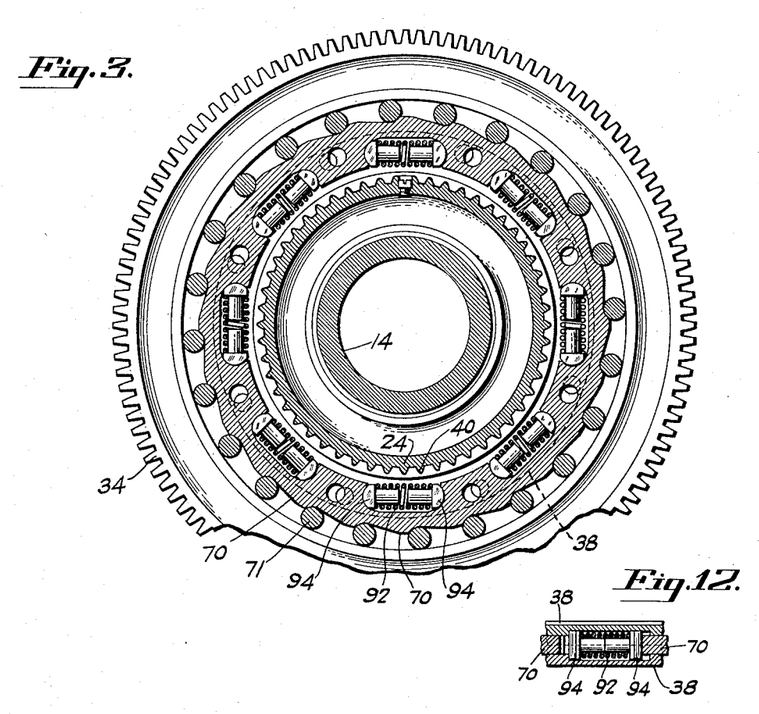
Fig. 3 is a transverse sectional view taken on the plane of line 3—3 of Fig. 1, showing part of the shifting mechanism.
Fig. 12 is a detail cross-sectional view of a spring construction normally holding a roller clutch in its disengaged position.
Figure 4:
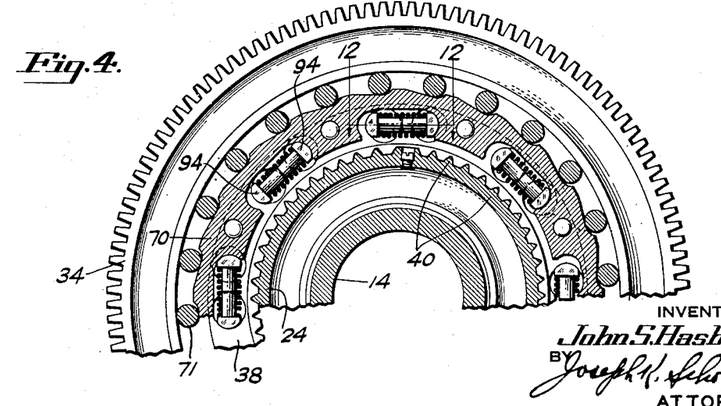
Fig. 4 is a fragmentary sectional view similar to Fig. 3 but with the parts in different relative positions.
Figure 5:
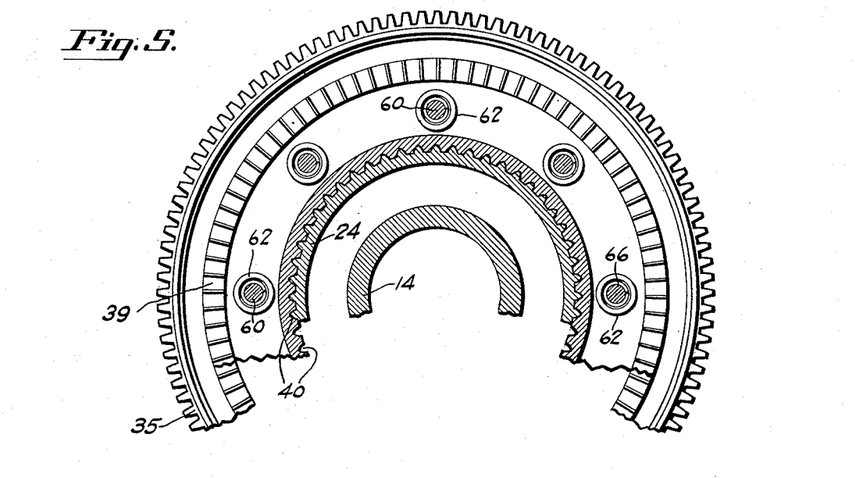
Fig. 5 is a fragmentary sectional view taken on the plane of line 5—5 of Fig. 1.
Figure 6:
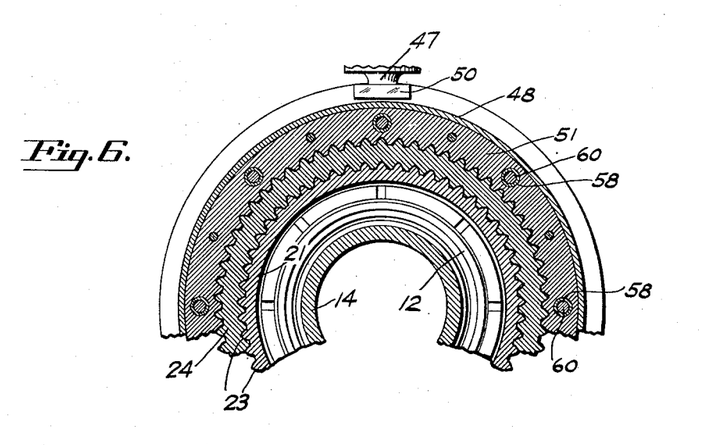
Fig. 6 is a fragmentary sectional view taken on the plane of line 6—6 of Fig. 1.

The roller type friction clutch referred to above is shown in detail in Figs. 3 and 4. During the shift from low to high speed gear ratio windmilling of the propeller 15 during flight rotates gear 34 through gears 27, 29 and 32 and forces a series of rollers 71 along cam paths formed in clutch member 70. This engagement of the rollers 71 with an internal cylindrical surface of gear 34 then frictionally drives member 70 and causes limited angular movement between members 34 and 70 and then relative movement between members 70 and 38. The relative angular movement of member 70 and member 38 brings into alignment the holes in members 38 and 70 so that the rods 60 can move to their extreme left hand position as shown in Fig. 10. In this final position of rods 60, the shiftable member 39 is in its driving position relative to gear 34. To assemble the member 70 relative to member 38 the member 38 is made in two parts as shown in Fig. 1 suitably retained in side by side relation.

The roller clutch member 70, when not driving or held in synchronizing position by the rods 60, is maintained in its overrunning or released position by compressed springs 92 bearing against and holding pairs of opposed headed members 94 slightly separated. The semi-cylindrical heads of one of each pair of these members 94 bears against abutment surfaces formed in the two part member 38 and the similarly formed heads of the opposite member of each pair bears against an abutment surface formed in member 70. The recesses, the end surfaces of which form the abutments for these headed members 94 are so designed that the heads can separate a definite but small amount only. The amount of separation is sufficient to misalign the holes so that rod 60 cannot pass through.

When the headed members 94 are in the position shown in Fig. 4 with their springs 92 compressed and the headed members 94 as close together as possible the openings in members 38 and 70 are in axial alignment permitting movement to the left of bolts or rods 60 to their extreme or positive high gear driving position. When the rods 60 are moved toward their right hand position, to shift from high to low gear position, removal of the rods from their openings in member 70 by partial movement of the rods releases the roller clutch by expansion of the springs 92 and relative rotative movement of the member 70 and gear 34. In this low gear driving position the member 38, splined to member 24, rotates faster than gear 34 and thus retains the roller clutch in its released position.

In operation in shifting from low to high gear ratio, the throttle is momentarily released and the manual valve 54 moved by its handle to actuate pistons 43 to rotate crankpins 47 to their left hand position. Movement of sleeves 58 and rods 60 when completed moves abutment flange 76 on ring 74 to permit valve 82 to move to the left. In this left hand position of valve 82 fluid under pressure is admitted from supply conduit 88 to the governor (not shown) to set the engine speed to a higher R. P. M.

When the shift is made from high to low gear ratio, the valve 82 is returned to the position shown in Fig. 1 permitting fluid from the governor to drain through conduit 91. The governor setting is then reset for the lower speed ratio.

It is to be understood that the invention is not limited to the specific embodiment herein illustrated and described, but may be used in other ways without departure from the spirit of the invention as defined by the following claims.

I claim:

1. In a shifting mechanism, a shiftable member movable between two positions, operating means, a resilient connection between said operating means and said shiftable member for holding said shiftable member in either of its two positions, said connection including a rod, a mechanism associated with the rod for indicating when said shiftable member can move in one direction from one position to the other, said resilient connection also including two washers mounted on said rod, a stop on said rod, a spring mounted on said rod between said stop and said shiftable member, a second spring mounted on said rod between the shiftable member and said operating means, said first named spring maintaining engagement of said shiftable member in an operating position until said indicating mechanism allows the shift to be made to the other operable position.

2. A shifting mechanism comprising, a shiftable member movable between two positions, operating means, a resilient connection between said operating means and said shiftable member for holding said shiftable member in either of its two positions, a mechanism associated with said resilient connection for indicating when said shiftable member can move in one direction from one position to the other, said resilient connection consisting of a rod whose movement is controlled by said mechanism having two stops thereon, two washers, mounted on said rod, one washer being engageable with one side of said shiftable member and the other washer being engageable with the other side of said shiftable member a spring mounted on said rod between one stop and one washer, a second spring mounted on said rod between the other washer and said operating means, said first named spring maintaining engagement of said shiftable member in an operating position until said indicating mechanism allows the shift to be made to the other operable position.

3. A shifting mechanism for a two-speed drive comprising a driven connection, two driving connections, an actuating device, a shiftable member movable thereby between two operative positions and having jaw teeth engageable with one or the other of the two driving connections in either operative positions, a resilient connection between said actuating device and shiftable member, one of said driving connections forming one element of a roller clutch, a second element of said roller clutch supported by said driven connection, said second element and driven connection having openings therein, said resilient connection having a part for controlling the movement of said shiftable member, biasing means by which said openings are normally resiliently maintained out of alignment, said openings being brought into alignment by action of said driving connection and the roller clutch, said misalignment maintaining said shiftable member inoperative by preventing said part from passing through said openings, said shiftable member being operable when the openings in said second element and said driven connection are in alignment since said part is thereby permitted to pass therethrough.

4. In a two-speed drive, an engine driven connection, two alternately engageable driving connections, an actuating device, a shiftable member movable thereby between two operative positions and having jaw teeth engageable with one or the other of the two said driving connections in either operative positions, resilient connections between said actuating device and shiftable member, one of said driving connections forming one element of a roller clutch, and a second element of said roller clutch supported by said driven connection, said second element and driven connection having openings therein, said resilient connections having a part for controlling the movement of said shiftable member, biasing means by which said openings are normally resiliently maintained out of alignment, and said openings being brought into alignment by action of said driven connection and the roller clutch, said misalignment maintaining said shiftable member inoperative by preventing said part from passing through said openings, said shiftable member being operable when the openings in said second element and said engine driven connection are in alignment since said part is thereby permitted to pass therethrough.

5. In combination, a propeller, an engine driven connection, two alternately engageable driving connections connected to said propeller, an actuating device, a shiftable member movable thereby between two operative positions and having jaw teeth engageable with one or the other of the two said driving connections to said propeller in either operative position, resilient connections between said actuating device and shiftable member, one of said driving connections forming one element of a roller clutch, a second element of said roller clutch supported by said engine driven connection, said second element and engine driven connection having openings therein, said resilient connections having a part for controlling the movement of said shiftable member, biasing means by which said openings are normally resiliently maintained out of alignment preventing complete movement of said shiftable member to an operative position by preventing said part from passing through said openings, said propeller rotating said roller clutch member to align said openings and permit complete movement of said shifting member since said part is thereby permitted to pass therethrough.

6. A shifting mechanism for a two-speed drive comprising, a driven connection, alternately engageable driving connections, an actuating device, a shiftable member movable thereby between two operative positions and having jaw teeth engageable with one of the two alternately engageable driving connections in either operative position, resilient connections between said actuating device and shiftable member, one of said driving connections forming one element of a roller clutch, a two-part member having a series of aligned openings therein mounted on said driven connection, an annular member mounted coaxially with said two-part member and having a series of openings therein, said resilient connections having a part for controlling the movement of said shiftable member, resilient members disposed between said two-part member and said annular member normally maintaining said openings out of alignment, a second roller clutch element on said annular member, said openings being out of alignment when said clutch is disengaged thereby preventing the movement of said shiftable member to an operative position by preventing said part from passing through said openings, and said openings being aligned by engagement of said clutch and permitting movement of said shiftable member to be completed since said part is then permitted to pass therethrough.

7. A shifting mechanism for a two-speed drive comprising, an operating device, a shiftable member movable between two operative positions and having teeth on both sides thereof, means driven by said shiftable member having spaced sets of teeth, each set forming a driving connection with the cooperating teeth on said shiftable member in its operative position, a resilient connection between said operating device and shiftable member for holding the teeth of said shiftable member in engagement with the cooperating set of teeth on said means in its operative position until said shiftable member is ready to move directly to its other operative position, a synchro-mesh mechanism for indicating when said shiftable member is ready to move directly to its other operative position, said resilient connection comprising a spring for acting between said operating device and said synchro-mesh mechanism when said shiftable member is not ready to move directly to its other operative position and for acting between said operating device and said shiftable member when said shiftable member is ready to move directly to its other operative position and a second spring acting to hold said shiftable member in its operative position until said shiftable member is ready to move directly to its other operative position.

8. A shifting mechanism for a two-speed drive comprising, an operating device, a shiftable member movable between two operative positions and having teeth on both sides thereof, means driven by said shiftable member having spaced sets of teeth, each set forming a driving connection with the cooperating teeth on said shiftable member in its operative position, a resilient connection between said operating device and shiftable member for holding the teeth of said shiftable member in engagement with the cooperating set of teeth on said means in an operative position until said shiftable member is ready to move directly to its other operative position, a synchro-mesh mechanism for indicating when said shiftable member is ready to move directly to its other operative position, said resilient connection comprising a rod which passes through a hole in said shiftable member, one end of said rod coacting with said synchro-mesh mechanism, the other end coacting with said operating device, a stop on said rod, a washer member on said rod between said stop and said operating device for engaging said shiftable member, a second washer member on said rod for engaging the other side of said shiftable member, a spring around said rod between said first-named washer member and said operating device, a second stop on said rod and a second spring around said rod between said second washer member and second stop on said rod, said second spring maintaining engagement of said shiftable member in an operating position until said synchro-mesh mechanism is ready to allow said shiftable member to shift to its other operative position.

9. A shifting mechanism for a two-speed drive comprising, an operating device, a shiftable member movable between two operative positions, and having teeth on both sides thereof, means driven by said shiftable member having spaced sets of teeth, each set forming a driving connection with the cooperating teeth on said shiftable member in its operative position, a resilient connection between said operating device and shiftable member for holding the teeth of said shiftable member in engagement with the cooperating set of teeth on said means in an operative position until said shiftable member is ready to move directly to its other operative position, a synchro-mesh mechanism having openings therein which when aligned indicate when said shiftable member is ready to move directly to its other operative position, said resilient connection comprising a rod which passes through a hole in said shiftable member and is positioned so that it passes through the openings of the synchro-mesh mechanism when aligned, the other end of said rod coacting with said operating device, a stop on said rod, a washer member on said rod between said stop and said operating device for engaging said shiftable member, a second washer member on said rod for engaging the other side of said shiftable member, a spring around said rod between said first-named washer member and said operating device, a second stop on said rod and a second spring around said rod between said second washer member and second stop on said rod, said second spring maintaining engagement of said shiftable member in an operating position until said synchro-mesh mechanism is ready to allow said shiftable member to shift to its other operative position.

10. A shifting mechanism for a two-speed drive comprising, a driven connection, two driving connections, an actuating device, a shiftable member movable thereby between two operative positions and having jaw teeth engageable with one or the other of the two driving connections in either operative position, a resilient connection between said actuating device and shiftable member, one of said driving connections forming one element of a roller clutch, a second element of said roller clutch supported by said driven connection, said second element and driven connection having openings therein, said resilient connection having a rod for controlling the movement of said shiftable member, said rod extending through a hole in said shiftable member, a stop on said rod, two washers mounted on said rod, a spring on said rod between said stop and one of said washers, a second spring between the other of the two washers and the actuating member, biasing means by which said openings are normally resiliently maintained out of alignment, said openings being brought into alignment by action of said driving connection and the roller clutch, said misalignment maintaining said shiftable member inoperative by preventing said rod from passing through said openings when said rod is biased in that direction by said second spring, said shiftable member being operable when the openings in said second element and said driven connection are in alignment since said rod is thereby permitted to pass therethrough.

References Cited in the file of this patent

UNITED STATES PATENTS

| Number | Name | Date |
|---|---|---|
| 1,175,014 | Roger | Mar. 14, 1916 |
| 1,177,133 | Parker | Mar. 28, 1916 |
| 2,318,328 | Nallinger | May 4, 1943 |
| 2,444,227 | Hasbrouck | June 29, 1948 |
| 2,512,103 | Hoffman et al. | June 20, 1950 |

FOREIGN PATENTS

| Number | Country | Date |
|---|---|---|
| 67,083 | Norway | Nov. 15, 1943 |